US012808279B2

(12) United States Patent
Zhou et al.

(10) Patent No.: US 12,808,279 B2
(45) Date of Patent: Nov. 24, 2026

(54) OIL-GAS WELL, WELL CEMENTATION METHOD, AND CEMENT COMPOSITION

(71) Applicants: CHINA PETROLEUM & CHEMICAL CORPORATION, Beijing (CN); SINOPEC PETROLEUM ENGINEERING TECHNOLOGY RESEARCH INSTITUTE CO., LTD, Beijing (CN)

(72) Inventors: Shiming Zhou, Beijing (CN); Peiqing Lu, Beijing (CN); Rengguang Liu, Beijing (CN); Kui Liu, Beijing (CN); Lishuang Wang, Beijing (CN); Xiaoyu Du, Beijing (CN); Jinlong Du, Beijing (CN); Xiaojiang Li, Beijing (CN)

(73) Assignees: CHINA PETROLEUM & CHEMICAL CORPORATION, Beijing (CN); SINOPEC PETROLEUM ENGINEERING TECHNOLOGY RESEARCH INSTITUTE CO., LTD, Beijing (CN)

( * ) Notice: Subject to any disclaimer, the term of this patent is extended or adjusted under 35 U.S.C. 154(b) by 46 days.

(21) Appl. No.: 18/681,061

(22) PCT Filed: Jul. 20, 2022

(86) PCT No.: PCT/CN2022/106817
§ 371 (c)(1),
(2) Date: Feb. 4, 2024

(87) PCT Pub. No.: WO2023/020189
PCT Pub. Date: Feb. 23, 2023

(65) Prior Publication Data

US 2024/0271504 A1 Aug. 15, 2024

(30) Foreign Application Priority Data

Aug. 18, 2021 (CN) ......................... 202110947918.7

(51) Int. Cl.
*E21B 33/14* (2006.01)
*C04B 20/00* (2006.01)
(Continued)

(52) U.S. Cl.
CPC ............ *E21B 33/14* (2013.01); *C04B 20/008* (2013.01); *C09K 8/467* (2013.01);
(Continued)

(58) Field of Classification Search
None
See application file for complete search history.

(56) References Cited

U.S. PATENT DOCUMENTS 4,252,193 A * 2/1981 Powers .................. C04B 28/02 106/676
2004/0149431 A1* 8/2004 Wylie .................... C09K 8/512 175/57
(Continued)

FOREIGN PATENT DOCUMENTS

CN 103030334 A 4/2013
CN 103803846 A 5/2014
(Continued)

OTHER PUBLICATIONS

Wei, Xiaosheng et al.; "Non-official translation: Portland Cement Setting and Hardening. (The hardening period)", Engineering Materials, edition 2, ISBN 978-7-5629-4184-2; Wuhan University of Technology Press; Sep. 30, 2013, pp. 76-80.

*Primary Examiner* — Anuradha Ahuja
(74) *Attorney, Agent, or Firm* — NKL Law; Allen Xue

(57) ABSTRACT

An oil-gas well, a well cementation method, and a cement composition are provided. The oil-gas well has a well body, a sleeve disposed in the well body, and a cement slurry cured product disposed between the well body and the sleeve. Due to the strength and toughness of the cement slurry cured product, at least part of the sleeve is a non-metal sleeve. By selecting specific cement, the cured product of cement has excellent mechanical strength and toughness, and is mated with the non-metal sleeve to achieve well cementation.

8 Claims, 2 Drawing Sheets

(51) Int. Cl.

| | |
|---|---|
| ***C09K 8/467*** | (2006.01) |
| *C04B 103/30* | (2006.01) |
| *C04B 111/90* | (2006.01) |

(52) U.S. Cl.

CPC ..... *C04B 2103/302* (2013.01); *C04B 2111/90* (2013.01); *C04B 2201/50* (2013.01)

(56) References Cited

U.S. PATENT DOCUMENTS

| | | | | |
|---|---|---|---|---|
| 2014/0332217 | A1* | 11/2014 | Rahman | C09K 8/487 106/737 |
| 2014/0367092 | A1* | 12/2014 | Roberson | E21B 43/25 166/250.01 |
| 2017/0141719 | A1 | 5/2017 | Horgnies et al. | |
| 2018/0244575 | A1* | 8/2018 | Fernández Lozano | C04B 28/04 |
| 2023/0391941 | A1* | 12/2023 | Miao | C09K 8/467 |

FOREIGN PATENT DOCUMENTS

| | | | |
|---|---|---|---|
| CN | 110054429 | A | 7/2019 |
| CN | 110621633 | A | 12/2019 |
| CN | 112479635 | A | 3/2021 |
| RU | 2726667 | C1 | 7/2020 |
| SU | 589370 | A1 | 1/1978 |
| WO | 2022078046 | A1 | 4/2022 |

* cited by examiner

OIL-GAS WELL, WELL CEMENTATION METHOD, AND CEMENT COMPOSITION

CROSS REFERENCE TO RELATED APPLICATIONS

This application is a U.S. national stage entry of PCT International Application No. PCT/CN2022/106817, filed Jul. 20, 2022, which claims benefit of the Chinese Patent Application No. 202110947918.7, filed Aug. 18, 2021, entitled "an oil well cement slurry system, a preparation method thereof and its use in cementing without metal casing", the content of which is incorporated herein by reference in its entirety.

FIELD

The present disclosure relates to the technical field of oil exploration, in particular to an oil-gas well, a well cementation method and a cement composition.

BACKGROUND

In order to maintain wellbore stability in the well cementing projects, the traditional well cementation technologies require to place sleeves in the open-hole formation and inject a cement slurry in the annulus between the sleeves and rock formation, so as to support the sleeves and seal off the high pressure oil layer, gas layer and water layer, and provide a safe wellbore environment for the oil and gas exploitation.

The cost of the sleeves is over 40% of the total cost of well drilling projects, the cost of the sleeves is mainly concentrated in the consumption of large size and heavy surface casing and the intermediate casing. The surface casing mainly serves to separate the shallow water layer in the earth surface, the unconsolidated layer and collapsible rock layers at the superficial part, the surface casing has a diameter within a range of 244.5 mm-508 mm, is mainly made of the grade steel K55 or N80; the intermediate casing is also called technical sleeve, during the process of drilling the complex formation, it requires to place the intermediate casing in the borehole to seal and keep the wellbore intact when encountering the complex sites such as collapsed layer, oil layer, gas layer, water layer, lost circulation formation, and salt formation. The intermediate casing has a diameter within a range of 177.8 mm-244.5 mm, is mainly made of the steel grades N80 and P110. In fact, the surface casing and intermediate casing are only used in the intermediate segments of the oil-gas well construction, prior to the completion of the well construction, a layer of production casing shall be further placed in the borehole in order to create a desirable wellbore environment for the oil and gas production, the production casing has a diameter within a range of 114.3 mm-177.8 mm, is mainly made of steel grades N80, P110, Q125 and V150.

Therefore, the shallow layer sleeves (surface casing and a portion of intermediate casing) do not perform function any more after the well completion under normal circumstances. The use of high steel grade and seamless metal sleeves throughout the wellbore results in very high drilling costs.

The casing, unlike the oil pipeline and drill rod, is not reusable and belongs to the disposable consumable material. Depending on the geological and operating conditions of the oil-gas well, it is necessary to design the multi-layered sleeves and inject cement into the space between the sleeves, in order to prevent the communication of different pressure systems in the formation. The total consumption of the sleeves in each oil-gas well accounts for more than 70% of the total tubular column materials.

The statistical data showed that the industry demand of oil-gas well sleeves in China was stable at 3-4 million tons with a market size as high as RMB 20-25 billion Yuan in 2012-2019. Along with the increasing in-depth exploration and development in the non-conventional oil-gas well, ultra-deep oil-gas well, deep water oil-gas well and other fields in China, the market demand of sleeves and sleeves will continuously expand, the oil-gas well construction costs will further increase if the conventional high steel grade seamless metal sleeves are used consistently. In view of the slow resurgence of oil price at present, it is extremely urgent to reduce costs and increase efficiency during the oil-gas well drilling and exploration process.

SUMMARY

The present disclosure aims to provide a novel cement slurry, the strength and toughness of the cement slurry after curing allows the combined use of the cement slurry and a non-metal casing to replace a part or all of the metal sleeve, in order to reduce use of the expensive metal sleeve, and lower the well cementing costs greatly, thereby performing the non-metal casing well cementation technology. The cement slurry cured product made from the cement composition of the present disclosure possesses excellent mechanical strength and desirable pumpability.

In order to achieve the above objects, a first aspect of the present disclosure provides an oil-gas well comprising a well body, a casing disposed in the well body, and a cement slurry cured product arranged between the well body and the sleeve, wherein at least part of the casing is a non-metal casing due to the strength and toughness of the cement slurry cured product.

A second aspect of the present disclosure provides a method of cementing a well comprising the steps of placing casing into a well, filling a cement slurry into a space between the borehole wall and the casing and curing the cement slurry, wherein at least part of the casing is a non-metal casing due to the strength and toughness of cured product obtained after curing the cement slurry.

A third aspect of the present disclosure provides a cement composition, wherein the cement composition has a resistivity of 10-100 Ω·m.

The present disclosure proposes for the first time and successfully enables the use of a non-metal casing in an oil-gas well, which greatly reduces well cementation costs and saves metal resources. By using the cement composition of the present disclosure, a cement slurry made from the cement composition has excellent pumpability, and its cured product exhibits excellent mechanical strength, which can meet the requirements of well cementation. The cement slurry made from the cement composition can be used in combination with a non-metal casing to replace at least part of the conventional high steel grade seamless metal pipes and sleeves, thereby greatly reducing the well cementation costs.

DESCRIPTION OF REFERENCE SIGNS

Figure 1:
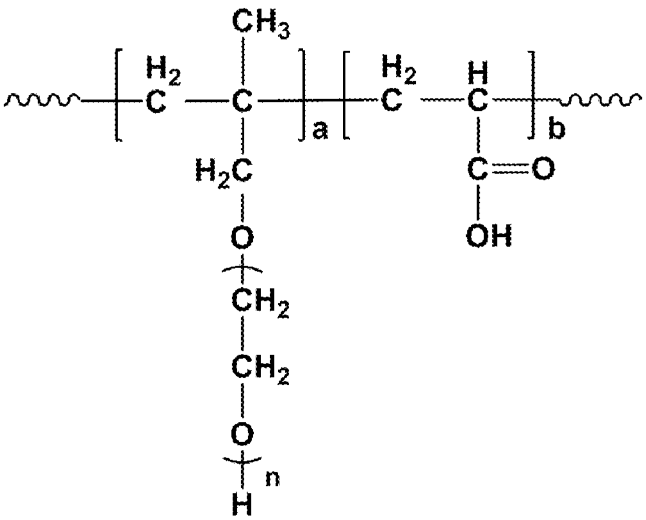
FIG. 1 is a schematic diagram illustrating a comb-shaped molecular structure of a polycarboxylic acid water reducing agent used in the present disclosure.

1. Metallic female buckle;
2. Metal double male buckle nipple;
3. Rectification coupling;
4. Non-metal sleeve.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The existing cements have many defects, which make the cements difficult to perform well cementing operations in conjunction with non-metallic tubular products. For example, although the conventional cement slurry systems have low cost (¥2,000-5,000/cubic meter) and can meet the technical requirements of the ordinary well cementing, the cement slurry has a compressive strength not exceeding 25 MPa, a tensile strengths not exceeding 2 MPa, and a low mechanical strength, the material cannot be used in alone to construct the artificial wellbores, and can hardly provide a robust wellbore environment for the oil and gas exploitation. Ultra-high strength concrete is mainly applied in the areas of bridges, railroad ties, high-rise buildings, military work and other fields, and it has the characteristics such as ultra-high strength, high durability and high toughness, its mechanical properties may be 10-20 times of the conventional cement slurry cured product, the compressive strength may reach 80-500 MPa, the tensile strength achieves 15-150 MPa, and the impact toughness attains 5,000 J or more, however, the ultra-high strength concrete contains large particle size aggregate, has a high consistency and low fluidity, and is not pumpable, thus cannot meet the requirements of well cementing.

The inventors of the present disclosure have found that by controlling the cement slurry to have suitable fluidity and the strength and toughness of the resulting cured product after curing of the cement slurry within a certain range, it is possible to use non-metal casing to replace a part or all of the metal casing in the oil-gas well.

An aspect of the present disclosure provides a cement composition, wherein the cement composition has a resistivity of 10-100 Ω·m.

The resistivity of the cement-based material change with time of cement hydration, the parameter can be used to describe the hydration process of the cement-based material, and determine an influence of mineral additives and chemical admixtures on the cement hydration. By measuring resistivity of the newly blended cement slurry and plotting the characteristic curve illustrating the change of resistivity over time, the setting hardening characteristics of the cement-based material can be determined.

The cement composition provided by the present disclosure allows cement slurry to be formulated with less amount of water, the cement slurry is characterized by a low water content and a high non-metallic mineralized substance, its "liquid-solid state" electrical resistivity is a significantly higher than the conventional oil-gas well cement slurry cured product. Therefore, the resistivity of the cement slurry cured product can be used for effectively discriminating the cement composition.

Unless otherwise specified in the present disclosure, the resistivity of the cement slurry refers to the liquid state resistivity measured by subjecting the cement slurry having a water content of 29 wt % to a standing still for 24 h at the temperature condition of 20° C.; the resistivity of both the cement composition and the cement slurry cured product refers to the resistivity of the product obtained after the cement slurry has cured for 72 h at the temperature condition of 20° C.

It has been discovered through testing that the cement slurry in the fluid state of the present disclosure has a resistivity within a range of 1-7 Ω·m, the cement slurry in the solid state conversion period has a resistivity within a range of 7-13 Ω·m, and the cement slurry cured product after solidification has a resistivity within a range of 10-100 Ω·m.

In contrast, the conventional well cement slurry in the fluid state (i.e., conventional available cement slurry state, typically water content of 42-50 wt %) has a resistivity within a range of 0.5-4 Ω·m, the cement slurry in the solid state conversion period has a resistivity within a range of 4-10 Ω·m, the resistivity of the cement slurry cured product (i.e., the cured cement slurry) obtained after 30 days solidification of cement slurry can reach 10-100 Ω·m. As a whole, the resistivity in each phase of the cement composition provided by the present disclosure can increase by 30%-50% than conventional cement slurry during the conversion phase of "liquid-solid" state, the difference is significant.

According to the present disclosure, the cement composition has a tensile strength of 5-10 MPa, a compressive strength of 60-100 MPa and a toughness of 5,000-8,000 J.

According to the present disclosure, the cement composition has a porosity of 6-15%.

In the present disclosure, the tensile strength, compressive strength and porosity of the cement composition refer to the tensile strength, compressive strength and porosity of a cured product obtained by curing a cement slurry at 20° C. for 72 h after the cement composition is mixed with water at a weight ratio of 1:0.29 to form the cement slurry.

The porosity represents the proportion of the volume of pores in cement slurry cured product to the total volume of cement slurry cured product, the parameter is used to characterize the degree of compactness, strength and permeability of the cement slurry cured product.

The cement composition provided by the present disclosure has moderate tensile strength, compressive strength and porosity, thereby enabling the use of non-metallic pipes for replacing the metallic pipes. According to the present disclosure, the cement composition is mixed with water in a weight ratio of 1:0.16-0.7, preferably 1:0.16-0.5 for use. In the above ratio range, the resulting cement slurry has a fluidity ≥18 cm, preferably 20-25 cm. As can be seen, the amount of water required for the cement composition of the present disclosure is lower, which enables a great saving in the used amount of water, and a reduction of the curing time.

According to a preferred embodiment of the present disclosure, the cement composition comprises cement, a water reducing agent and a filling material, the filling material comprising a micron filling material, a submicron filling material and an optional nano-scale active material.

A cement composition formulated using the above ingredients is used in the present disclosure, the particles having various particle sizes can be compounded in gradation by adding a micron filling material, a submicron filling material and an optional nano-scale active material, when the cement composition is formulated into a cement slurry, it can increase compactness of the cement slurry system and enhance strength of the cement slurry system.

According to the present disclosure, the content of the water reducing agent is 0.5 wt %-4 wt %, preferably 2 wt %-4 wt % of the cement mass.

According to the present disclosure, the content of the filling material is 20 wt %-65 wt %, preferably 20 wt %-55 wt % of the cement mass.

According to a preferred embodiment of the present disclosure, the composition further comprises a toughening material for increasing toughness of the cement composition.

In the present disclosure, the toughening material is selected from a fibrous material having a certain degree of toughness, and it may be selected from metal fibers or non-metal fibers, such as plastic fibers (e.g. polyvinyl alcohol fibers), metal fiber filaments.

Preferably, the toughening material has a diameter of 200-600 m.

Preferably, the toughening material has a length of 5-30 mm.

Preferably, the toughening material has a length-diameter ratio of 3-100.

In the present disclosure, when the length-diameter ratio of the toughening material is within the above range, the toughening effect is desirable and the effect on fluidity of cement slurry is small.

In the present disclosure, in order to increase the binding capacity of the fiber and the cement interface, the toughening material may be in the form of wave, circle, enlarged end, hook and the like; preferably, the cross-section of the toughening material may be in the shape of a rectangle, a saw tooth, a meniscus; further preferably, the cross-sectional size of the toughening material varies alternately in the length direction. The toughening material can be directly purchased from the market.

The present disclosure provides a wave-shaped toughening material added into a cement composition, wherein the wave-shaped toughening material in the obtained cement slurry cured product is distributed three-dimensionally and loosely between the hydration products in the cement slurry system, the wave-shaped toughening material with such a state has desirable cohesiveness with the cement slurry system and cannot be easily pulled out, thereby hindering the occurrence and expansion of micro-cracks within the cement slurry system by the bridge-chain action, and greatly increasing the toughness and dynamic load impact resistance of the cement slurry system.

According to the present disclosure, the content of the toughening material is 0.1 wt %-0.5 wt %, preferably 0.3 wt %-0.4 wt % of the cement mass.

According to the present disclosure, the sum of contents of the micron filling material and the submicron filling material is 15 wt %-60 wt %, preferably 15 wt %-50 wt % of the cement mass.

According to the present disclosure, the content of the submicron filling material is 3 wt %-10 wt %, preferably 5 wt %-10 wt % of the cement mass.

According to the present disclosure, the content of the nano-scale active material is 0-5 wt %, preferably 0.5 wt %-5 wt % of the cement mass.

According to the present disclosure, the nano-scale active material has a particle size larger than 1 nm and not greater than 400 nm.

According to the present disclosure, the nano-scale active material is at least one selected from the group consisting of carbon nanotube, nano calcium carbonate, nano titanium oxide, nano silica, nano magnesium oxide, nano iron oxide and nano aluminum oxide.

In some embodiments of the present disclosure, the nano-scale active material is at least one selected from carbon nanotube (310-370 nm, 230-290 nm), nano calcium carbonate (120-180 nm), nano titanium oxide (60-100 nm), nano silica (40-80 nm), nano magnesium oxide (30-70 nm), nano iron oxide (20-60 nm) and nano aluminum oxide (10-50 nm).

According to the present disclosure, the micron filling material has a particle size larger than 5 m and not greater than 500 m.

According to the present disclosure, the submicron filling material has a particle size larger than 0.4 m and not greater than 5 m.

According to the present disclosure, both the micron filling material and the submicron filling material are selected from non-metallic mineral.

Preferably, the non-metallic mineral is at least one selected from the group consisting of iron ore powder, silica powder, magnesite, slag, fly ash, micro-silicon and limestone.

The micro-silicon in the present disclosure, also called as silicon ash, is formed when ferrosilicon and industrial silicon (metallic silicon) are smelted, a large amount of $SiO_2$ and Si gas with strong volatility are generated in an ore-smelting electric furnace, the gas is discharged and then quickly oxidized, condensed and precipitated in air.

In some embodiments of the present disclosure, both the micron filling material and the submicron filling material are selected from non-metallic mineral; preferably, the non-metallic mineral is at least one selected from the group consisting of iron ore powder (350-500 μm), silica powder (120-180 μm), magnesite (45-75 μm), slag (1-5 μm), fly ash (0.5-300 μm), micro-silicon (0.4-1 μm) and limestone (0.4-1 μm).

In the present disclosure, the composition and content of the filling material in the cement composition can be detected using a standard test sieve and an X-ray diffractometer. The specific method comprises the following steps:

(1) Screening the cement composition by using the standard test sieves with different meshes. Firstly, screening the cement composition by using a 150-mesh standard test sieve, wherein the screen residues with the particle size larger than the sieve are micron filling material fine aggregates; then testing the screen residue by using an X-ray diffractometer, and comparing the measured X-ray diffraction spectrum with the standard card to analyze the phases of the screen residue.

(2) Continuously screening the sieved material in step (1) by using a 2,000-mesh standard test sieve, testing the screen residue by using an X-ray diffractometer, comparing the measured X-ray diffraction spectrum with the standard card, and analyzing the phase composition of the screen residue to be cement.

(3) Further screening the sieved material in step (2) by using a 10,000-mesh standard test sieve, wherein the screen residue with a particle size larger than the sieve is submicron filling material; testing the screen residue by using an X-ray diffractometer, and comparing the measured X-ray diffraction spectrum with the standard card to analyze the phase of screen residue.

(4) The finally obtained sieved material in step (3) is nanometer filling material, testing the finally obtained sieved material by using an X-ray diffractometer, and comparing the measured X-ray diffraction spectrum with the standard card to analyze the phase of sieved material.

According to the present disclosure, the cement is an oil well cement, preferably a grade G oil well cement.

According to the present disclosure, the water reducing agent is a polycarboxylic acid water reducing agent.

Preferably, the polycarboxylic acid water reducing agent of the present disclosure has a typical comb-shaped structure (as shown in FIG. 1). By taking advantage of the steric hindrance of the comb-shaped structure and electrostatic repulsion effects, the attraction agglomeration of the particles with positive and negative charges is depolymerized, free water is released, the water filling amount is reduced, the used amount of mixing water is decreased, the water reducing rate is over 40%, thereby reducing the porosity of the cement slurry cured produced formed by the reaction of the mixing water, increasing compactness of an oil well cement system, maintaining desirable fluidity, and remarkably improving the strength of the oil well cement system.

Preferably, the content of the polycarboxylic acid in the polycarboxylic acid water reducing agent is 75 wt %-90 wt %.

Preferably, the polycarboxylic acid water reducing agent comprises structural unit provided by acrylic acid and structural unit provided by methallyl alcohol polyoxyethylene ether.

Further preferably, a molar ratio of the structural unit provided by the acrylic acid to the structural unit provided by the methallyl alcohol polyoxyethylene ether in the polycarboxylic acid water reducing agent is 2-8:1. In some specific embodiments of the present disclosure, the methallyl alcohol polyoxyethylene ether in use has a molecular weight of 200-500 g/mol.

Preferably, the mass average molecular weight of the polycarboxylic acid water reducing agent is within a range of 20,000-170,000 g/mol.

In the present disclosure, the raw materials for synthesizing the polycarboxylic acid water reducing agent can further comprise methoxy polyethylene glycol methacrylate (MPEGMA), 2-acrylamide-2-methylpropanesulfonic Acid (AMPS), hydroxyethyl acrylate (HEA) and the like, so that special functional groups such as siloxane and sulfonic acid group are further introduced into the molecular structure of the polycarboxylic acid water reducing agent, thereby further enhancing the adsorption performance of the polycarboxylic acid water reducing agent and improving the dispersibility and the compatibility.

According to another preferred embodiment of the present disclosure, the polycarboxylic acid water reducing agent comprises a structural unit a, a structural unit b and a structural unit c, wherein the structural unit a is provided by unsaturated polyether, the structural unit b is provided by unsaturated acid and/or salt thereof and/or anhydride thereof, and the structural unit c is provided by silane and/or siloxane comprising polymerizable groups and having not lower than 5 carbon atoms.

Further preferably, a molar ratio of the structural unit a, the structural unit b and the structural unit c is 1:(1-20):(0.01-0.5), preferably 1:(4-12):(0.05-0.3).

According to the present disclosure, the polycarboxylic acid water reducing agent has a weight average molecular weight of 20,000-90,000 g/mol, preferably 25,000-55,000 g/mol.

According to the present disclosure, the polymerizable group is one or more of a carbon-carbon double bond, a carbon-carbon triple bond and an epoxy group.

According to the present disclosure, the silane and/or siloxane is at least one selected from the group consisting of 7-octenyltrimethoxysilane, vinyldodecyltrimethoxysilane, vinylhexadecyltrimethoxysilane and vinyloctadecyltrimethoxysilane.

According to the present disclosure, the polycarboxylic acid water reducing agent has a comb-shaped structure.

According to the present disclosure, the polycarboxylic acid water reducing agent is a random copolymer.

According to the present disclosure, the DSC peak of the polycarboxylic acid water reducing agent is a single peak.

According to the present disclosure, the unsaturated acid is at least one selected from the group consisting of acrylic acid, methacrylic acid, vinylsulfonic acid, vinylphosphoric acid, maleic acid, itaconic acid, fumaric acid, 2-acrylamido-2-methylpropanesulfonic acid, styrenesulfonic acid and propenylsulfonic acid.

According to the present disclosure, the polycarboxylic acid water reducing agent has a thickening index not more than 1.5, preferably 1-1.35, at a temperature of 120° C. and above.

According to the present disclosure, the polycarboxylic acid water reducing agent has a compressive strength index not less than 0.8, preferably 0.95-1.1, and more preferably 1.0-1.1 at a temperature of 110° C. for 24 h.

According to the present disclosure, the polycarboxylic acid water reducing agent has a consistency coefficient not more than 0.8, preferably 0.4-0.75 at a temperature of 85° C.

According to the present disclosure, the polycarboxylic acid water reducing agent has a fluidity index n not less than 0.6, preferably 0.7-0.95 at a temperature of 85° C.

According to the present disclosure, the polycarboxylic acid water reducing agent has a thickening index of 0.95-1.5, preferably 0.98-1.2 at a temperature of 150° C.

In the present disclosure, the thickening index refers to the ratio of the thickening time of the cement base slurry after adding the cement water-reducing agent relative to the cement base slurry before adding the cement water-reducing agent, wherein the cement base slurry may be various slurry obtained by mixing water with the cement for well cementation.

In the present disclosure, the parameters of the thickening time, consistency coefficient K, fluidity index n and compressive strength are measured according to the National Standard GB/T 19139-2003 of China.

As can be seen from the data, the polycarboxylic acid cement water reducing agent adopted by the present disclosure has almost no retardation at high temperature, such that the different application requirements can be met, for example, the polycarboxylic acid cement water reducing agent can be used for well cementation, conventional building, as well as various cement application scenarios requiring retardation or not.

According to the present disclosure, the cement composition further comprises at least one of a filtrate reducer, a retarder and a defoaming agent.

In some specific embodiments of the present disclosure, the grade of the filtrate reducer may be SCF180 L, the grade of the retarder may be DZH-3, and the grade of the defoaming agent may be DZX.

The filtrate reducer, the retarder and the defoaming agent of the grades are commercially available from the Shelfoil Petroleum Equipment & Services Co., Ltd.

Preferably, the content of the filtrate reducer is 3 wt %-8 wt % of the cement mass.

Preferably, the content of the retarder is 1 wt %-3 wt % of the cement mass.

Preferably, the content of the defoaming agent is 0.1 wt %-1 wt % of the cement mass.

The desired cement slurry can be produced by mixing the above-mentioned cement composition with water in a weight ratio of 1:0.16-0.7, preferably 1:0.16-0.5.

In another aspect, the present disclosure also provides an oil-gas well comprising a well body, a casing disposed in the well body, and a cement slurry cured product arranged between the well body and the sleeve, wherein at least part of the casing is a non-metal casing due to the strength and toughness of the cement slurry cured product.

In the present disclosure, the main function of the non-metal casing is to provide a shaping and solidifying geometric space for the cement slurry in the wellbore, and prevent the cement blocks from falling down, thus the non-metal casing and the cement slurry can replace the high-cost metal sleeve.

According to the present disclosure, the cement slurry cured product has a tensile strength of 5-10 MPa, a compressive strength of 60-100 MPa and a toughness of 5,000-8,000 J. Therefore, the non-metal casing in combination with the cement slurry can replace the metal sleeve.

According to the present disclosure, the cement slurry cured product has a resistivity of 10-100 Ω·m and a porosity of 6-15%.

By adopting the above-mentioned cement slurry in the present disclosure, the cement slurry cured product obtained after curing of the cement slurry has excellent strength and toughness, so that at least part of the traditional high-steel grade seamless metal casing is replaced with the non-metal sleeve, and the cost of the well cementation can be greatly reduced.

According to the present disclosure, the casing is a shallow casing comprising a surface casing and an intermediate casing.

In the present disclosure, at least part of casing is selected as the non-metal sleeve, a part or all of the surface casing and/or the intermediate casing can be replaced by the non-metal casing according to the requirement of working condition.

According to the present disclosure, the non-metal casing comprises a plurality of non-metal sleeve, and each of the non-metal casing has a length of 8-10 m, an outer diameter of 125-600 mm and a wall thickness of 12-16 mm.

According to the present disclosure, the plurality of non-metal casing is connected by a metal casing joint nipple.

In the present disclosure, the mode of connecting the non-metal casing with the metal casing joint nipple is not particularly limited, it may be at least one selected from the group consisting of thermal fusion connection, mechanical connection and adhesive connection.

In a specific embodiment of the present disclosure, a length of the metal casing joint nipple is 0.5-1 m, and the metal casing joint nipple comprises a metal female buckle, a metal double male buckle nipple and a rectification coupling; two non-metal sleeves having a metal casing joint nipple at both ends are connected with each other by using a metal female buckle and a metal double male buckle nipple, and are collimated through a recitification coupling.

In the present disclosure, because the non-metal casing is provided with the metal casing joint nipple, the downward insertion of the non-metal casing can be performed by adopting the casing insertion equipment commonly used in the well cementation projects, and the casing heads are installed according to the specification. Meanwhile, the combination mode of "upper metal casing+lower non-metal casing" can be flexibly adopted to accomplish construction the wellbore according to the practical requirement of working conditions.

According to the present disclosure, the non-metal casing is a plastic casing or a steel-plastic composite pipe (high-quality iron wire is used as a reinforcing phase and added into a non-metal plastic pipe).

Preferably, a base material of the non-metal casing is at least one selected from the group consisting of heat-resistant polyethylene, random copolymer polypropylene (i.e., type III copolymer polypropylene), polybutylene, cross-linked polyethylene, block copolymer polypropylene and hardened polyvinyl chloride.

In the present disclosure, the non-metal casing prepared with the base material can ensure that the temperature resistance of the material exceeds 40° C., and the material density is lower than 25% of the casing to be replaced (e.g., the traditional high-steel grade seamless metal sleeve).

The present disclosure further provides a well cementation method comprises the steps of placing casing into a well, filling a cement slurry into a space between the borehole wall and the casing and curing the cement slurry, wherein at least part of the casing is a non-metal casing due to the strength and toughness of cured product obtained after curing the cement slurry.

In the present disclosure, the cured product obtained after curing of the cement slurry has the same meaning with the cement slurry cured product, the terms pertain to the different expression forms of the same substance in two use environments.

The desired fluidity, strength and toughness can be obtained using the above-mentioned cement slurry provided by the present disclosure.

The curing conditions include a curing temperature of 20-40° C. and a curing time of 24-48 h.

According to a preferred embodiment of the present disclosure, a method for preparing the cement slurry of the present disclosure comprises the following steps:

(1) weighing cement, a micron filling material, a submicron filling material, an optional nano-scale active material and an optional toughening material according to a certain proportion, and uniformly mixing the materials to obtain a mixed powder.

(2) weighing a certain amount of fresh water, a water reducing agent, an optional filtrate reducer, an optional retarder and an optional defoaming agent respectively, and uniformly blending the weighed materials to obtain mixed liquid.

(3) adding the mixed liquid into a mixing container, rotating a stirrer at a low speed (3,000-4,000±200 rpm), then adding the mixed powder within 10-20 s, continuously stirring for 35-50 s at a high speed (10,000-12,000±500 rpm), and uniformly stirring to obtain an oil well cement slurry.

The present disclosure will describe in detail below with reference to Examples. Unless otherwise specified in the following examples, all reagents in use are commercially available industrial products.

(1) Cement: grade G oil well cement purchased from Xinjiang Qingsong Cement Co., Ltd.;

(2) Water reducing agent:

(a1) the content of the polycarboxylic acid was 81.3 wt %, the polycarboxylic acid water reducing agent comprised a structural unit provided by acrylic acid and a structural unit provided by methallyl alcohol polyoxyethylene ether, a molar ratio of the structural unit provided by the acrylic acid and the structural unit provided by the methallyl alcohol polyoxyethylene ether is 6; the mass average molecular weight of the polycarboxylic acid was 99,500 g/mol;

the polycarboxylic acid water reducing agents (a2), (a3) and (a4) were respectively prepared according to the methods of Examples 1-3 of PCT/CN 2021/112586.

(3) The SCF180 L filtrate reducer, the DZH-3 retarder and the DZX defoaming agent were all purchased from the Shelfoil Petroleum Equipment & Services Co., Ltd. in China.

(4) Conventional cement slurry referred to a commercially available Jiahua grade G cement product, the cement slurry was prepared and obtained by mixing the cement with water in a weight ratio of 1:0.44, the product obtained after curing for 72 h under the temperature condition of 20° C., the compressive strength of the product obtained after curing for 72 h had a compressive strength of 18 (MPa/72 h), a tensile strength of 1.1 (MPa/72 h) and a toughness of 1,000 J.

The test methods related to the performance parameters in the present disclosure were as follows:

(1) The test method of resistivity: the parameter was measured according to the National Standard GB/T 31838.2-2019 of China.

(2) The test method of tensile strength: the parameter was measured according to the Standard NB/T 14004.2-2016.

(3) The testing method of the compressive strength: the parameter was measured according to the National Standard GB/T 19139-2012 of China.

(4) The test method of toughness: the parameter was measured according to the Standard ASTM C1609/C1609M-12.

(5) The test method of porosity: the parameter was measured according to the National Standard GB/T 21650.1-2008 of China.

(6) The test method of cement slurry density: the parameter was measured according to the National Standard GB/T 19139-2012 of China.

(7) The test method of cement slurry fluidity: the parameter was measured according to the National Standard GB/T 2419-2005 of China.

(8) The water-to-ash ratio was a weight ratio of the liquid material used in the formulation of cement slurry to the solid material used in the formulation of cement slurry.

Example 1

500 g of cement, 50 g of silicon powder (160 μm), 25 g of micro-silicon (0.5 μm), 25 g of nano silica (60 nm) and 1.5 g of polyvinyl alcohol fiber (with a diameter of 400 m and a length of 10 mm) were weighted, the materials were uniformly blended to obtain a mixed powder. 125 g of fresh water, 10 g of polycarboxylic acid water reducing agent (a1), 30 g of SCF180 L filtrate reducer, 5 g of DZH-3 retarder and 1.5 g of DZX defoaming agent were weighted, the materials were uniformly blended to obtain a mixed liquid.

The mixed liquid was poured into a mixing container, a stirrer was rotated therein at a low speed (4,000±200 rpm), the mixed powder was then added within 15 s, the stirring was continuously performed for 35 s at a high speed (12,000±500 rpm), the materials were uniformly stirred to obtain an oil well cement slurry.

The cement slurry was subjected to a performance test, the test results were shown in Table 1.

The cured product of the cement slurry was subjected to a performance test, the test results were shown in Table 2.

Figure 2:
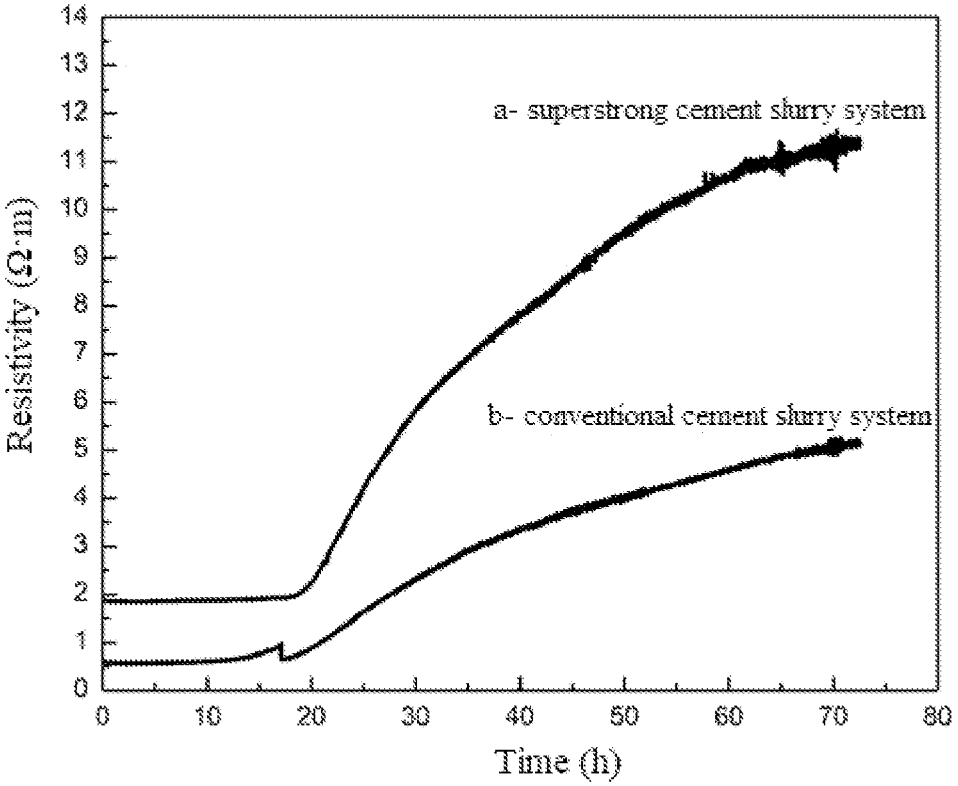
FIG. 2 is a graph comparing the change in resistivity over time between the cement slurry prepared in Example 1 of the present disclosure and the conventional cement slurry.

The curve of resistivity versus curing time was illustrated in FIG. 2.

Example 2

500 g of cement, 50 g of iron ore powder (400 μm), 100 g of silicon powder (150 μm), 25 g of limestone (0.5 μm), 25 g of nano magnesium oxide (50 nm) and 2 g of polyvinyl alcohol fiber (with a diameter of 200 μm and a length of 5 mm) were weighted, the materials were uniformly blended to obtain a mixed powder.

120 g of fresh water, 15 g of polycarboxylic acid water reducing agent (a1), 40 g of SCF180 L filtrate reducer, 10 g of DZH-3 retarder and 2 g of DZX defoaming agent were weighted, the materials were uniformly blended to obtain a mixed liquid.

The mixed liquid was poured into a mixing container, a stirrer was rotated therein at a low speed (4,000±200 rpm), the mixed powder was then added within 15 s, the stirring was continuously performed for 35 s at a high speed (12,000±500 rpm), the materials were uniformly stirred to obtain an oil well cement slurry.

The cement slurry was subjected to a performance test, the test results were shown in Table 1.

The cured product of the cement slurry was subjected to a performance test, the test results were shown in Table 2.

Example 3

500 g of cement, 250 g of fly ash (200 μm), 50 g of micro-silicon (0.8 μm), 0.25 g of carbon nanotube (260 nm), 0.25 g of carbon nanotube (330 nm) and 1.5 g of polyvinyl alcohol fiber (with a diameter of 300 m and a length of 5 mm) were weighted, the materials were uniformly blended to obtain a mixed powder. 350 g of fresh water, 10 g of polycarboxylic acid water reducing agent (a1), 35 g of SCF180 L filtrate reducer, 5 g of DZH-3 retarder and 3 g of DZX defoaming agent were weighted, the materials were uniformly blended to obtain a mixed liquid.

The mixed liquid was poured into a mixing container, a stirrer was rotated therein at a low speed (4,000±200 rpm), the mixed powder was then added within 15 s, the stirring was continuously performed for 35 s at a high speed (12,000±500 rpm), the materials were uniformly stirred to obtain an oil well cement slurry.

The cement slurry was subjected to a performance test, the test results were shown in Table 1.

The cured product of the cement slurry was subjected to a performance test, the test results were shown in Table 2.

Example 4

500 g of cement, 100 g of silicon powder (180 μm), 100 g of silicon powder (120 μm), 15 g of slag (5 μm), 15 g of micro-silicon (0.5 μm), 0.25 g of nano iron oxide (40 nm), 0.25 g of nano aluminum oxide (15 nm) and 2 g of polyvinyl alcohol fiber (with a diameter of 300 m and a length of 5 mm) were weighted, the materials were uniformly blended to obtain a mixed powder. 250 g of fresh water, 20 g of polycarboxylic acid water reducing agent (a1), 40 g of SCF180 L filtrate reducer, 8 g of DZH-3 retarder and 3 g of DZX defoaming agent were weighted, the materials were uniformly blended to obtain a mixed liquid.

The mixed liquid was poured into a mixing container, a stirrer was rotated therein at a low speed (4,000±200 rpm), the mixed powder was then added within 15 s, the stirring was continuously performed for 35 s at a high speed (12,000±500 rpm), the materials were uniformly stirred to obtain an oil well cement slurry.

The cement slurry was subjected to a performance test, the test results were shown in Table 1.

The cured product of the cement slurry was subjected to a performance test, the test results were shown in Table 2.

Example 5

A cement slurry was prepared according to the method of Example 4, except that the material ratios were adjusted such that the used amount of micron filling material was 40 wt %, the used amount of submicron filling material was 10 wt %, the used amount of nano-scale active material was 3 wt %, the used amount of polycarboxylic acid water reducing agent was 4 wt %, the used amount of toughening material was 0.3 wt % relative to the used amount of cement; the added amount of water caused that a weight ratio of the cement composition to water was 1:0.28.

The cement slurry was subjected to a performance test, the test results were shown in Table 1.

The cured product of the cement slurry was subjected to a performance test, the test results were shown in Table 2.

Example 6

A cement slurry was prepared according to the method of Example 4, except that the material ratios were adjusted such that the used amount of micron filling material was 25 wt %, the used amount of submicron filling material was 8 wt %, the used amount of nano-scale active material was 0.5 wt %, the used amount of polycarboxylic acid water reducing agent was 4 wt %, the used amount of toughening material was 0.3 wt % relative to the used amount of cement; the added amount of water caused that a weight ratio of the cement composition to water was 1:0.28.

The cement slurry was subjected to a performance test, the test results were shown in Table 1.

The cured product of the cement slurry was subjected to a performance test, the test results were shown in Table 2.

Example 7

A cement slurry was prepared according to the method of Example 4, except that the nano-scale active material was not added into the cement composition.

The cement slurry was subjected to a performance test, the test results were shown in Table 1.

The cured product of the cement slurry was subjected to a performance test, the test results were shown in Table 2.

Example 8

A cement slurry was prepared according to the method of Example 4, except that the used amount of filling material was 15 wt % of the cement mass.

The cement slurry was subjected to a performance test, the test results were shown in Table 1.

The cured product of the cement slurry was subjected to a performance test, the test results were shown in Table 2.

Example 9

A cement slurry was prepared according to the method of Example 4, except that the used amount of submicron material was 15 wt % of the cement mass.

The cement slurry was subjected to a performance test, the test results were shown in Table 1.

The cured product of the cement slurry was subjected to a performance test, the test results were shown in Table 2.

Example 10

A cement slurry was prepared according to the method of Example 4, except that the same weight of polycarboxylic acid water reducing agent (a2) was used in place of polycarboxylic acid water reducing agent (a1).

The cement slurry was subjected to a performance test, the test results were shown in Table 1.

The cured product of the cement slurry was subjected to a performance test, the test results were shown in Table 2.

Example 11

A cement slurry was prepared according to the method of Example 4, except that the same weight of polycarboxylic acid water reducing agent (a3) was used in place of polycarboxylic acid water reducing agent (a1).

The cement slurry was subjected to a performance test, the test results were shown in Table 1.

The cured product of the cement slurry was subjected to a performance test, the test results were shown in Table 2.

Example 12

A cement slurry was prepared according to the method of Example 4, except that the same weight of polycarboxylic acid water reducing agent (a4) was used in place of polycarboxylic acid water reducing agent (a1).

The cement slurry was subjected to a performance test, the test results were shown in Table 1.

The cured product of the cement slurry was subjected to a performance test, the test results were shown in Table 2.

Example 13

A cement slurry was prepared according to the method of Example 4, except that the SCF180 L filtrate reducer was not used.

The cement slurry was subjected to a performance test, the test results were shown in Table 1.

The cured product of the cement slurry was subjected to a performance test, the test results were shown in Table 2.

Comparative Example 1

A cement slurry was prepared according to the method of Example 4, except that the micron material was replaced by the same weight of nano silica (180 nm).

The cement slurry was subjected to a performance test, the test results were shown in Table 1.

The cured product of the cement slurry was subjected to a performance test, the test results were shown in Table 2.

Comparative Example 2

A cement slurry was prepared according to the method of Example 4, except that the polycarboxylic acid water reducing agent (a1) was not used.

The cement slurry was subjected to a performance test, the test results were shown in Table 1.

The cured product of the cement slurry was subjected to a performance test, the test results were shown in Table 2.

Application Example 1

The No. 1 well had a depth of 1,500 m and a wellbore diameter of 444.5 mm, the heat-resistant polyethylene non-metal casing with a length of 10 m, an outer diameter of 339.7 mm and a wall thickness of 12 mm was selected as the sleeve.

Figure 3:
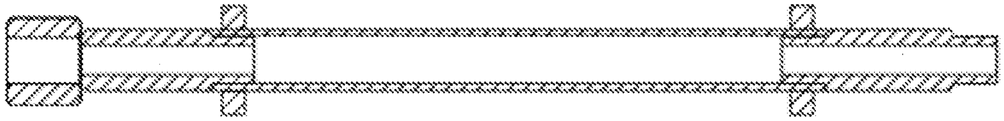
FIG. 3 is a schematic diagram illustrating the structure of a non-metal plastic tube after coupling with a metal casing by a joint nipple.
Figure 4:
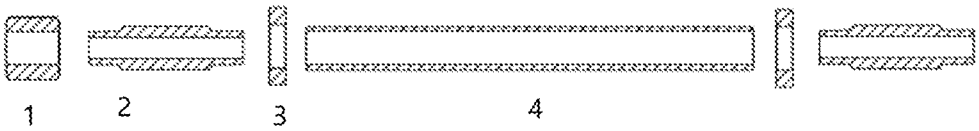
FIG. 4 is a schematic diagram illustrating the structure of a non-metal plastic tube before coupling with a metal casing by a joint nipple.

After the well drilling was finished, the non-metal casing with a metal casing joint nipple at both ends was downwardly inserted into the wellbore (the non-metal casing before and after the connection was shown in FIG. 3 and FIG. 4), after the non-metal casing was downwardly inserted to a certain depth, an upper end of the non-metal casing was connected with a metal casing and continuously inserted into the well until the bottom of the non-metal casing reached the designed depth, the total length of the non-metal casing was 1,350 m, and the total length of the metal casing was 150 m.

The cement slurry prepared in Example 10 was introduced into the metal casing and the non-metal sleeve, the cement slurry entered an annular space between sleeves and the wellbore via the bottom outlet of sleeves, the cement slurry raised its height by 1,500 m to carry out the well cementation operation. The operation condition of the No. 1 well was monitored after the well body was completed and put into production.

Compared with the cement cementation method completely using the metal sleeve, the cost of casing was saved by RMB 935,000 yuan by adopting the mode of matching metal casing with non-metal casing in the Application Example.

The drilling operation of the No. 1 well was accomplished in 28 days, the complex accident did not occur, the stable production can be performed after continuous operation for 1,800 days, and the phenomena of annular space under pressure was avoided.

TABLE 1

| | Density (g/cm$^3$) | Water-to-ash ratio (wt %) | Fluidity (cm) | Resistivity (Ω · m) |
|---|---|---|---|---|
| Example 1 | 1.98 | 28.6 | 20.5 | 3.1 |
| Example 2 | 2.1 | 26.6 | 20 | 3.5 |
| Example 3 | 1.75 | 50.2 | 23 | 3.0 |
| Example 4 | 1.88 | 43.8 | 21 | 3.3 |
| Example 5 | 1.96 | 39.8 | 22 | 3.6 |
| Example 6 | 2.02 | 40 | 23 | 3.5 |
| Example 7 | 1.88 | 44 | 23 | 3.1 |
| Example 8 | 1.85 | 47 | 24 | 3.2 |
| Example 9 | 2.02 | 43.8 | 18 | 3.7 |
| Example 10 | 1.88 | 43.8 | 23 | 3.2 |
| Example 11 | 1.87 | 43.8 | 24 | 3.3 |
| Example 12 | 1.88 | 43.8 | 23 | 3.1 |
| Example 13 | 1.89 | 43.8 | 23 | 3.2 |

TABLE 1-continued

| | Density (g/cm$^3$) | Water-to-ash ratio (wt %) | Fluidity (cm) | Resistivity (Ω · m) |
|---|---|---|---|---|
| Comparative Example 1 | 1.93 | 43.8 | 19 | 2.8 |
| Comparative Example 2 | 1.87 | 43.8 | 15 | 2.9 |

TABLE 2

| | Compressive strength (MPa/72 h) | Tensile strength (MPa/72 h) | Toughness (J) | Resistivity (Ω · m) | Porosity (vol %) |
|---|---|---|---|---|---|
| Example 1 | 72 | 7.3 | 6210 | 11.3 | 7.5 |
| Example 2 | 70 | 6.5 | 5934 | 11.7 | 7.8 |
| Example 3 | 60 | 5.0 | 5189 | 11.2 | 9.5 |
| Example 4 | 65 | 6.1 | 5624 | 10.8 | 8.7 |
| Example 5 | 68 | 6.3 | 5712 | 10.7 | 8.5 |
| Example 6 | 68 | 6.4 | 5820 | 10.8 | 8.8 |
| Example 7 | 61 | 5.2 | 5235 | 11.8 | 13.5 |
| Example 8 | 60 | 5.1 | 5335 | 11.5 | 11.7 |
| Example 9 | 67 | 6.2 | 5703 | 11.5 | 7.6 |
| Example 10 | 82 | 8.0 | 6534 | 11.7 | 9.5 |
| Example 11 | 83 | 7.9 | 6581 | 11.6 | 9.6 |
| Example 12 | 84 | 8.1 | 6589 | 11.7 | 9.7 |
| Example 13 | 63 | 6.0 | 5561 | 10.6 | 8.5 |
| Comparative Example 1 | 55 | 4.7 | 4702 | 9.1 | 7.8 |
| Comparative Example 2 | 50 | 4.5 | 4695 | 8.9 | 7.9 |

As indicated by the results of the Examples of the present disclosure, a use of the solution of the present disclosure enables the obtained cement slurry to have excellent fluidity by adjusting the matching proportion of the cement composition. The compressive strength, tensile strength and toughness of the cement slurry cured product obtained after curing of cement slurry are greatly improved compared with the conventional cement cured product.

By preparing the cement slurry with the cement composition in the technical scheme of the present disclosure, a use of the cement slurry in the cement cementation enables that at least part of metal sleeves is replaced with the non-metal sleeves, and the cost of well cementation is greatly reduced.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A method of cementing a well comprising:

forming a sleeve comprising one or more metal sections and one or more non-metal sections;

placing the sleeve into a borehole of the well;

filling a cement slurry between a wall of the borehole and the sleeve; and curing the cement slurry to form a cement slurry cured product, wherein the cement slurry cured product has a resistivity of 10-100 Ω·m, and wherein forming the sleeve comprises connecting one of the one or more metal sections to one of the one or more non-metal sections with a joint nipple, wherein the cement slurry comprises a cement, water, a water reducing agent and a filling material, and the filling material comprises a micron filling material and a submicron filling material, and both the micron filling material and the submicron filling material are selected from one or more non-metallic minerals, wherein, relative to a weight of the cement in the cement slurry, a sum of the micron filling material and the submicron filling material is 15 wt %-60 wt % and the submicron filling material is 3 wt %-10 wt %, and the water reducing agent is a polycarboxylic acid water reducing agent.

2. The method according to claim 1, wherein (i) the cement slurry has a resistivity within a range of 1-7 Ω·m and a fluidity within a range of 18-25 cm;

(ii) the cement slurry cured product has a tensile strength of 5-10 MPa, a compressive strength of 60-100 MPa and a toughness of 5,000-8,000 J;

(iii) the cement slurry cured product has a porosity of 6-15%;

(iv) the one or more non-metallic minerals are selected from the group consisting of iron ore powder, silica powder, magnesite, slag, fly ash, micro-silicon, and limestone; or a combination thereof.

3. The method according to claim 2, wherein (i) the filling material further comprises a nano-scale material and the nano-scale material is up to 5 wt % of the cement in the cement slurry;

(ii) the filling material further comprises a nano-scale material and the nano-scale material has a particle size larger than 1 nm and not greater than 400 nm;

(iii) the filling material further comprises a nano-scale material and the nano-scale material is at least one selected from the group consisting of carbon nanotube, nano calcium carbonate, nano titanium oxide, nano silica, nano magnesium oxide, nano iron oxide and nano aluminum oxide;

(iv) the micron filling material has a particle size larger than 5 μm and not greater than 500 μm;

(v) the submicron filling material has a particle size larger than 0.4 m and not greater than 5 μm; or a combination thereof.

4. The method according to claim 3, wherein (i) the sum of the micron filling material and the submicron filling material is 15 wt %-50 wt % of the cement in the cement slurry;

(ii) the submicron filling material is 5 wt %-10 wt % of the cement in the cement slurry; (iii) the one or more non-metallic minerals is at least one selected from the group consisting of iron ore powder, silica powder, magnesite, slag, fly ash, micro-silicon, and limestone; or a combination thereof.

5. The method according to claim 2, wherein (i) the polycarboxylic acid water reducing agent has a thickening index not more than 1.5 at a temperature of 120° C. and above;

(ii) the polycarboxylic acid water reducing agent has a compressive strength index not less than 0.8 and not more than 1.1, at a temperature of 110° C. for 24 h;

(iii) the polycarboxylic acid water reducing agent has a consistency coefficient not more than 0.8 and not less than 0.4 at a temperature of 85° C.;

(iv) the polycarboxylic acid water reducing agent has a fluidity index n not less than 0.6 and not more than 0.95, at a temperature of 85° C.;

(v) the polycarboxylic acid water reducing agent has a thickening index of 0.95-1.5, at a temperature of 150° C.; or a combination thereof.

6. The method according to claim 5, wherein (i) the polycarboxylic acid water reducing agent has a thickening index of 1-1.35, at a temperature of 120° C. and above;

(ii) the polycarboxylic acid water reducing agent has a compressive strength index of 0.95-1.1, at a temperature of 110° C. for 24 h;

(iii) the polycarboxylic acid water reducing agent has a consistency coefficient of 0.4-0.75, at a temperature of 85° C.;

(iv) the polycarboxylic acid water reducing agent has a fluidity index n of 0.7-0.95, at a temperature of 85° C.;

(v) the polycarboxylic acid water reducing agent has a thickening index of 0.98-1.2, at a temperature of 150° C.; or a combination thereof.

7. The method according to claim 6, wherein the polycarboxylic acid water reducing agent has a compressive strength index of 1.0-1.1, at a temperature of 110° C. for 24 h.

8. The method of claim 1, wherein the well is an oil-gas well.

* * * * *